Dec. 4, 1928.
W. R. HOSE
1,693,900
DIRIGIBLE HEADLIGHT
Filed June 5, 1925      2 Sheets-Sheet 2
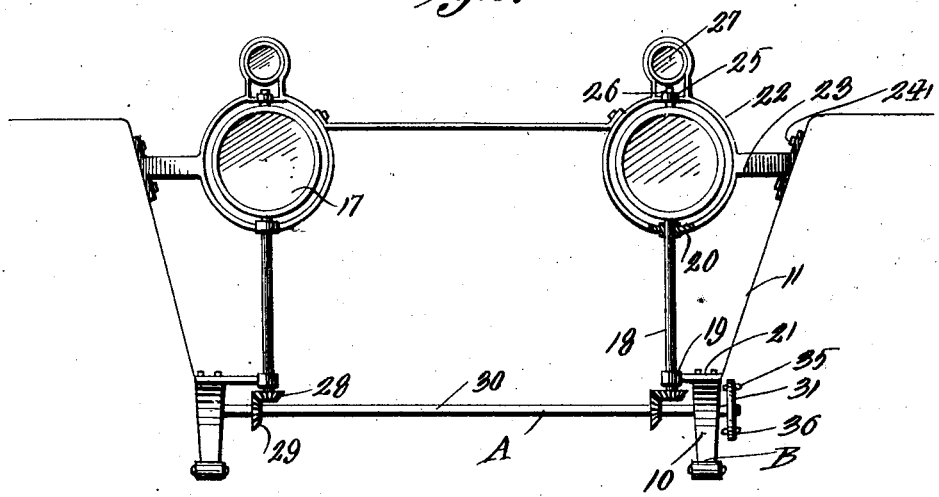
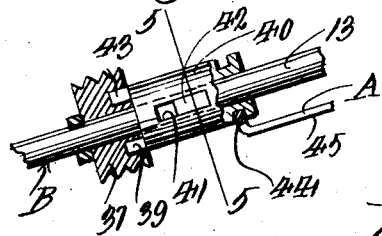
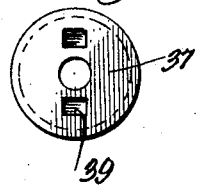
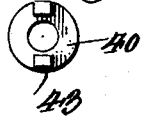
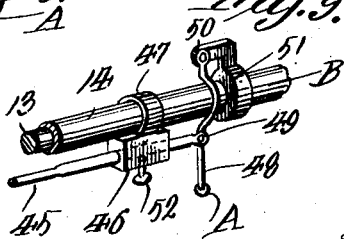
WITNESSES
Inventor
WALTER R. HOSE
By Richard B. Owen
Attorney Patented Dec. 4, 1928.

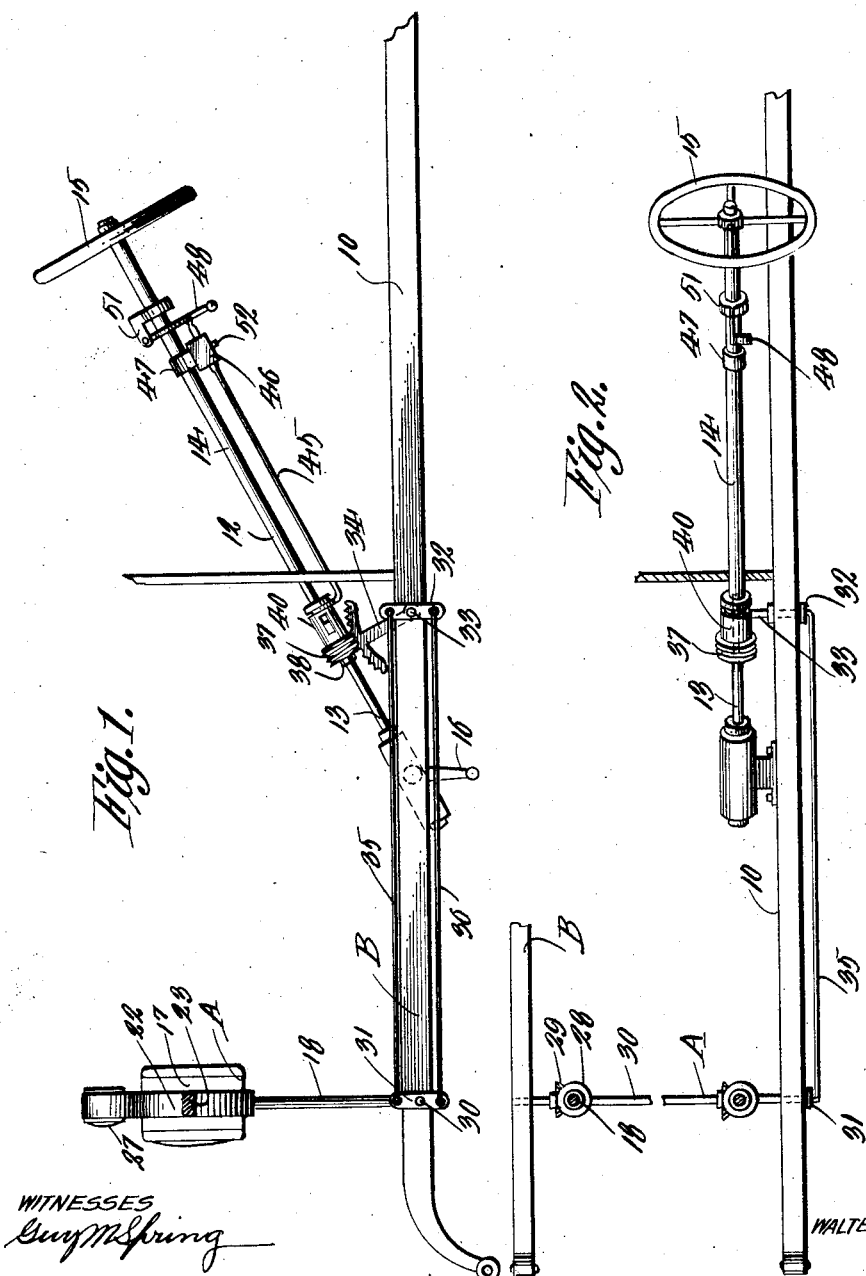

1,693,900

UNITED STATES PATENT OFFICE.

WALTER R. HOSE, OF NEW ULM, MINNESOTA.

DIRIGIBLE HEADLIGHT.

Application filed June 5, 1925. Serial No. 35,209.

This invention appertains to attachments for motor vehicles and more particularly to a novel means for permitting the headlights to turn synchronously with the steering wheels of the automobile, whereby the headlight rays will follow the turns of a road at all times.

The primary object of the present invention is the provision of novel means for mounting the headlights upon an automobile and novel means for operatively connecting the headlights with the steering post or shaft of the automobile, so that the headlights will be turned by the said shaft as well as the steering wheels.

A further object of the invention is the provision of novel means mounted upon the steering column of the automobile for permitting the disconnection of the steering shaft or post from the operating means for the headlights, whereby the headlights can be held stationary when so desired.

A still further object of the invention is to provide a novel dirigible headlight for motor vehicles of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed, and illustrated in the accompanying drawings, in which drawings, Figure 1 is a fragmentary side elevation of the chassis of a motor vehicle showing the novel headlight attachment incorporated therewith, Figure 2 is a fragmentary plan view of the chassis of an automobile showing the improved headlight attachment incorporated therewith, Figure 3 is a front elevation of the improved dirigible headlight showing the same incorporated with an automobile, Figure 4 is a detail fragmentary section illustrating the novel clutch mechanism mounted upon the steering shaft of the automobile for permitting the headlights to be thrown into and out of operative connection with the said steering shaft, Figure 5 is a detail section taken on the line 5—5 of Figure 4, Figure 6 is an end elevation of the worm carried by the shaft for operating the headlights, Figure 7 is an end elevation of the clutch member carried by the steering post or shaft for engaging the worm for locking the same on the said shaft, Figure 8 is a fragmentary perspective view of a portion of the steering shaft showing the lugs welded thereon for engaging the sliding clutch member,

Figure 9 is a fragmentary perspective view illustrating the means carried by the shell of the steering column for permitting the operation of the said clutch member.

Referring to the drawings in detail, wherein similar reference characters designate corresponding parts throughout the several views, the letter A generally indicates the improved dirigible headlight attachment for a motor vehicle B.

The headlight attachment A can be applied to any conventional type of motor vehicle and the same has been simply shown to illustrate the use of the improved headlights.

As shown the vehicle B includes the usual longitudinally extending side beams 10 and the front fenders 11. The frame of the vehicle B includes the usual or any conventional type of steering mechanism 12, which as shown includes the steering shaft 13 rotatably mounted within the supporting sleeve or casing 14. The upper end of the steering shaft 13 is provided with the usual hand wheel 15, while the lower end thereof is provided with the means 16 for engaging the drag links (not shown) for steering the front wheels (not shown).

The improved attachment A comprises headlights 17 which are carried by standards 18. These standards are rigidly attached to the headlights 17 and are mounted within suitable bearings 19 and 20. Bearings 19 are carried by straps 21 which can be bolted to the forward terminals of the side beams 10. The bearings 20 are carried by the lower sides of annular brackets 22 which are provided with arms 23 which are bolted or otherwise secured as at 24 to the fenders 11. The upper sides of the brackets 20 also carry bearings 25 which rotatably receive bearing pintles 26 carried by the upper sides of the headlight. The brackets 22 also support small city street running lamps 27. The lower terminals of the lamp standards 18 below the bearings 19 have keyed or otherwise secured thereto beveled pinions 28 which mesh with beveled pinions 29 keyed to a transversely extending shaft 30. This shaft 30 is mounted in bearings carried by the side beams 10 in a manner to provide for its oscillatory adjustment.

A double crank 31 is secured at a point equi-distant its ends to one end of the shaft 30 and a similar double crank 32 is secured at a point equi-distant its ends to a stub shaft 33. This stub shaft 33 is rotatably carried by one of the side beams 10 and has secured to its inner end a segmental worm gear 34. The terminals of the double cranks 31 and 32 are connected together by longitudinally extending connecting rods 35 and 36.

Rotatably mounted upon the steering shaft 13 is a worm 37 which meshes at all times with the segmental worm gear 34. This worm 37 is held against sliding movement on the shaft 13 by means of a collar or the like 38. The upper face of the worm is provided with a pair of sockets 39 for a purpose, which will be hereinafter more fully described.

A clutch member 40 is slidably mounted upon the shaft 13 and is provided with diametrically opposed longitudinally extending ways 41 which receive guide lugs 42 secured to the shaft 13 in any desired way. By this construction it can be seen that the clutch mechanism 40 is mounted for rotary movement with the said shaft 13. The lower end of the clutch member 40 is provided with lugs 43 which are adapted to fit in the sockets 39 when the clutch member is in its lowermost position and it can be seen that when the clutch member 40 is moved into engagement with the worm 37 that the said worm will rotate with the shaft when the same is turned. This will of course bring about movement of the segmental gear 34.

A shifting collar 44 is carried by the clutch member 40 and is engaged by a yoke at the forward end of an operating rod 45 which is mounted in parallel relation to the steering shaft. The operating rod 45 slidably extends through a guide block 46 which is rigidly held in place on the housing 14 of the shaft 13 in any desired way such as by a collar 47. The extreme upper end of the rod 45 is operatively connected to an operating lever 48 by means of a pin and slot connection 49 and this lever is pivoted as at 50 to a supporting bracket 51 rigidly secured in any preferred way to the said shell or casing 14 of the steering shaft 13.

It is obvious that, by manipulating the lever 48, the clutch section 40 can be moved into and out of engagement with the worm 37.

In order to hold the rod 45 in any desired adjusted position a suitable thumb screw 52 can be carried by the guide block 56 for frictionally engaging the said rod 45.

In use of the improved invention, when the machine is being driven at night time, the lever 48 is moved downwardly, which will throw the clutch member 40 into contact with the worm 37. Now when the steering wheel 15 is turned so as to permit the vehicle to follow the turn of a road the worm 37 will be turned with the shaft 13, which will operate the double crank 32 which in turn will oscillate the shaft 30 through the medium of the double crank 31 and the links 35 and 36. The oscillation of the shaft 30 will turn the lamp standards 18 and consequently turn the headlights of the machine in the same direction as the steering wheel. This of course will throw the rays of light in the same direction as the travel of the machine and thus illuminate the roadway directly in advance of the machine at all times irrespective of the turns or curves therein.

If it is desired to hold the lamps 17 stationary it is merely necessary to lift up on the lever 48 which will move the clutch member 40 from out of engagement with the worm 37 and thus permit the shaft 13 to turn independently of the worm.

From the foregoing description, it can be seen that I have provided a dirigible headlight attachment for motor vehicles which is operated directly from the steering shaft of the vehicle and which can be readily incorporated with existing types of automobiles at a small cost.

Changes as to details, may be made without departing from the spirit or the scope of this invention, but:—

What I claim as new is:—

In headlight adjusting mechanism of the class described, the combination with the steering column and steering post mounted therein, of a rotatable headlight support, a segmental rack supported for arcuate movement, operative connection between said rack and said headlight support for effecting rotation of the headlight support upon arcuate movement of the segmental rack, a worm pinion mounted upon the steering post and meshing with the rack, means for clutching the pinion with the post for rotation therewith comprising a sleeve slidably mounted upon the post, the pinion having sockets therein, clutch teeth carried by the sleeve and engageable in said sockets in one position of shifting adjustment of the sleeve upon the post, means connecting the sleeve with the post for rotation therewith and for sliding adjustment thereon, a guide block fixedly mounted upon the under side of the column adjacent the upper end thereof, the said block having a longitudinal passage therethrough parallel to the column, a rod slidably fitted at its upper portion through the passage in the said block and guided thereby for sliding movement beneath the column, a yoke at the lower end of the rod embracing the said sleeve and connecting the sleeve for movement with the rod, a bracket upon the column above the said block, an actuating hand lever pivoted at its upper end to the bracket and having a portion extending about the column and beneath the same, the upper end of the said rod being pivotally connected with the said portion of the hand lever, and means carried by the block and adjustable to coact with the said rod to hold the rod in positions of sliding adjustment in the block.

In testimony whereof I affix my signature.

WALTER R. HOSE.